United States Patent Office.

HENRY FAKE, OF WILLIAMSBURG, NEW YORK, ASSIGNOR TO HIMSELF AND CHARLES A. TODD, OF NEW YORK CITY.

Letters Patent No. 99,175, dated January 25, 1870.

IMPROVEMENT IN RECTIFYING WHISKEY DURING DISTILLATION.

The Schedule referred to in these Letters Patent and making part of the same.

*To all whom it may concern:*

Be it known that I, HENRY FAKE, of Williamsburg, in the county of Kings, and State of New York, have invented a new and improved Process of Rectifying Whiskey During Distillation; and I do hereby declare that the following is a full, clear, and exact description thereof, which will enable others skilled in the art to make and use the same.

This invention relates to a new method of withdrawing the fusel-oils from their intimate combination with whiskey, while the same is in the process of distillation. The separate process of rectification is thereby avoided, and whiskey without any traces of fusel-oil is produced.

This invention consists in adding to the mash, while it is in a state of fermentation, a suitable quantity of lime-water and charcoal, in proportions and at a period hereinafter stated.

To enable others skilled in this art to practise my improvement, I will proceed to describe the same.

Corn, or other suitable grain, in proper quantities, is ground and formed into mash, by the ordinary means, and is allowed to ferment, as is usual.

At a period of about four hours less than the common duration of fermentation, I add to the beer or mash the following ingredients:

For two hundred bushels of mash, I use twenty pounds of lime, slaked in about twenty gallons of water, which is drawn off, after the lime is precipitated and the liquor is clear, and mixed with about one hundred and twenty pounds of pulverized charcoal, and the whole added to the mash at the above-stated period of its fermentation.

The beer or mash, with the lime-water and charcoal added, is allowed to stand and ferment about four hours, and is then let down to the receiving-cistern, and the process of distillation proceeds in the ordinary manner.

By this process, the lime destroys the fusel-oil, and during the distillation, the charcoal purifies the liquor, and leaves it in a perfectly deodorized state.

Besides reducing the cost of producing liquors, by obviating the necessity of a separate rectification, I am enabled, by my process, to produce five per cent. more whiskey from a given quantity of mash than can be obtained by the old and common processes.

I propose to use animal-charcoal; but it is obvious that vegetable-charcoal may be used, though a larger quantity is required to produce the same result.

What I claim, is—

The process herein described for producing rectified whiskey, the same consisting in treating the beer or mash by means of lime-water and charcoal, substantially as set forth.

HENRY FAKE.

Witnesses:
CHAS. W. CHESHIRE,
M. B. WHITTLESEY.